United States Patent
Ogino

(10) Patent No.: US 7,941,485 B2
(45) Date of Patent: May 10, 2011

(54) MEASUREMENT SYSTEM, MANAGEMENT DEVICE AND PROCESSING DISTRIBUTION METHOD USING THE SYSTEM

(75) Inventor: Atsushi Ogino, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 11/601,733

(22) Filed: Nov. 20, 2006

(65) Prior Publication Data

US 2007/0182584 A1    Aug. 9, 2007

(30) Foreign Application Priority Data

Nov. 30, 2005    (JP) ................................. 2005-345394

(51) Int. Cl.
*G06F 15/16*    (2006.01)

(52) U.S. Cl. ........ 709/205; 709/204; 709/207; 709/223; 370/390; 455/519

(58) Field of Classification Search .................. 709/201, 709/202, 204–207, 223–226, 238–244; 370/232–390
See application file for complete search history.

(56) References Cited

U.S. PATENT DOCUMENTS

| | | | |
|---|---|---|---|
| 6,434,622 B1 * | 8/2002 | Monteiro et al. ............. | 709/231 |
| 6,781,988 B1 | 8/2004 | Gotoh et al. | |
| 7,043,007 B2 * | 5/2006 | McPartlan et al. ........ | 379/265.02 |
| 7,142,512 B1 * | 11/2006 | Kobayashi et al. ........... | 370/232 |
| 7,583,601 B2 * | 9/2009 | Yasukawa et al. ............ | 370/238 |
| 2003/0147386 A1 * | 8/2003 | Zhang et al. .................... | 370/390 |
| 2003/0156540 A1 * | 8/2003 | Trossen et al. ................ | 370/232 |
| 2003/0227897 A1 * | 12/2003 | Okada ............................. | 370/342 |
| 2004/0218536 A1 * | 11/2004 | Yasukawa et al. ............ | 370/238 |
| 2005/0044213 A1 * | 2/2005 | Kobayashi et al. ........... | 709/224 |
| 2005/0130669 A1 | 6/2005 | Mizugaki et al. | |
| 2005/0181815 A1 * | 8/2005 | Shostak ......................... | 455/519 |
| 2005/0185630 A1 * | 8/2005 | Aoki et al. ..................... | 370/349 |
| 2006/0018319 A1 * | 1/2006 | Palin et al. ..................... | 370/390 |
| 2006/0147204 A1 * | 7/2006 | Yasukawa et al. ............. | 398/26 |
| 2006/0184683 A1 * | 8/2006 | Bosscha et al. ............... | 709/230 |
| 2006/0218271 A1 * | 9/2006 | Kasslin et al. ................ | 709/224 |
| 2006/0294259 A1 * | 12/2006 | Matefi et al. .................. | 709/248 |
| 2007/0099624 A1 * | 5/2007 | Guo ............................... | 455/453 |
| 2007/0182584 A1 * | 8/2007 | Ogino ...................... | 340/870.21 |
| 2007/0201467 A1 * | 8/2007 | Kakani .......................... | 370/390 |

FOREIGN PATENT DOCUMENTS

| | | |
|---|---|---|
| JP | 2000-092091 A | 3/2000 |
| JP | 2001-144761 | 5/2001 |
| JP | 2004-101254 | 9/2002 |
| JP | 2005-182641 | 12/2003 |
| JP | 2005-140617 | 6/2005 |

* cited by examiner

*Primary Examiner* — Quang N. Nguyen
*Assistant Examiner* — Razu A Miah
(74) *Attorney, Agent, or Firm* — Stites & Harbison, PLLC; Juan Carlos A. Marquez, Esq.

(57) ABSTRACT

In a measurement system that comprises plural measurement devices classified by groups, and plural data processing devices on a network that receives and processes measured data from the measurement devices, the data processing devices are smoothly allocated. The measurement devices belong to groups based on the areas in which they are located, and respectively transmit measured data to a multicast address defined for each of the groups to which they belong. A management device detects an overloaded or failed data processing device, stops data processing on a multicast address at which the data processing device receives data, alternatively commands another less loaded data processing device to join the multicast group, receive measured data transmitted to the multicast address, and process the data.

12 Claims, 7 Drawing Sheets

FIG.3

| GROUP NUMBER | MULTICAST ADDRESS | BELONGING MEASUREMENT DEVICE IDENTIFICATION NUMBER |
|---|---|---|
| G1 | 239.128.0.1 | 011<br>012<br>01N1 |
| G2 | 239.128.0.2 | 021<br>022<br>02N2 |
| ... | ... | ... |
| Gj | 239.128.0.j | 0j1<br>0j2<br>0jNj |

FIG.4

| DATA PROCESSING DEVICE IDENTIFICATION NUMBER | JOIN GROUP IDENTIFICATION NUMBER | LOAD STATUS (PERCENTAGE OF CPU USAGE [%]) | EXISTENCE OF FAILURE |
|---|---|---|---|
| 121 | G1 | 90 | ABSENT |
| | Gj | | |
| 122 | − | 100 | PRESENT |
| ... | ... | ... | ... |
| 12m | − | 5 | ABSENT |

| DATA PROCESSING DEVICE IDENTIFICATION NUMBER | JOIN GROUP IDENTIFICATION NUMBER | LOAD STATUS (PERCENTAGE OF CPU CASE [%]) | | EXISTENCE OF FAILURE |
|---|---|---|---|---|
| | | GROUP UNIT | TOTAL | |
| 121 | G1 | 60 | 90 | ABSENT |
| | Gj | 30 | | |
| 122 | — | — | 1 | PRESENT |
| ... | ... | ... | ... | ... |
| 12m | — | 5 | 5 | ABSENT |

FIG.7

| GROUP NUMBER | MULTICAST ADDRESS | BELONGING MEASUREMENT DEVICE IDENTIFICATION NUMBER | PRIORITY |
|---|---|---|---|
| G1 | 239.128.0.1 | 011<br>012<br>01N1 | P1=1 |
| G2 | 239.128.0.2 | 021<br>022<br>02N2 | P2=2 |
| ... | ... | ... | ... |
| Gj | 239.128.0.j | 0j1<br>0j2<br>0jNj | Pj=2 |

FIG.8

| DATA PROCESSING DEVICE IDENTIFICATION NUMBER | JOIN GROUP IDENTIFICATION NUMBER | LOAD STATUS (PERCENTAGE OF CPU USAGE [%]) | EXISTENCE OF FAILURE |
|---|---|---|---|
| 121 | G1<br>Gj | 100 | ABSENT |
| 122 | — | 100 | PRESENT |
| ... | ... | ... | ... |
| 12m | — | 100 | PRESENT |

MEASUREMENT SYSTEM, MANAGEMENT DEVICE AND PROCESSING DISTRIBUTION METHOD USING THE SYSTEM

CLAIM OF PRIORITY

The present application claims priority from Japanese application JP 2005-345394 filed on Nov. 30, 2005, the content of which is hereby incorporated by reference into this application.

FIELD OF THE INVENTION

The present invention relates to a technique for distributing loads among plural data processing devices that process data measured in plural measurement devices in a measurement system.

BACKGROUND OF THE INVENTION

US 2004/0046693 A1 discloses a wireless LAN system in which plural wireless receiving stations measure the reception times of wireless signals transmitted from a base station and a terminal, and a server device collects the measured data to decide the position of the terminal.

On the other hand, in recent computer network systems, a load balancer is used to distribute loads on a server device. According to Japanese Patent Laid-Open No. 2005-182641, the load balancer receives an access request to a server from a client and allocates processing to one of plural server devices under control of the server to achieve load distribution.

SUMMARY OF THE INVENTION

The wireless system disclosed in US 2004/0046693 A1 may be applied to a large-scale operation. For example, the wireless system may trace the positions of mobile, specific terminals carried by people who move among different floors within a building. Or the wireless system may trace the positions of mobile, specific terminals equipped to in materials conveyed among plural facilities within a certain site. In such scenes, plural areas targeted to trace the mobile, specific terminals exist, and the number of terminals targeted for position decision increases. Therefore, two or more of the wireless systems must be disposed.

If one wireless system is simply disposed in the above-described one area, the number of the server devices matches the number of areas.

However, if the server devices are properly shared between relevant areas, the number of server devices can be made smaller than the number of the areas. It becomes possible to distribute overload of server devices occurring due to bias of the locations of the terminals. Furthermore, even if failure occurs in one server device, another server device can perform processing instead.

Accordingly, a problem occurs of how measured data by each wireless receiving station (each measurement device) is allocated to plural server devices (data processing devices).

No solution for this problem is disclosed in US 2004/0046693 A1. The above-described Japanese Patent Laid-Open No. 2005-182641 also does not disclose such a problem that occurs in the tracing of the positions of terminals and the like. Furthermore, it is difficult to simply apply these techniques to solve the problem. This is because, to decide the position of a terminal (to perform required data processing), individual data by wireless receiving stations (measurement devices belonging to one group) allocated to one area must be allocated to one server device (data processing device).

As described above, in a measurement system that comprises plural measurement devices classified by groups on a network, and plural data processing devices on the network that receive and process data from the measurement devices within the groups, it is an objective to smoothly allocate the data processing devices by detecting failure and overload in the data processing devices so that desired data processing is not interrupted.

The following measurement system and a processing distribution method using the system are provided as means for solving the above-described problem.

The measurement system comprises plural measurement devices connected over a network, and plural data processing devices that receive data measured by the measurement devices and process the data. The measurement devices belong to any one of plural groups, and transmit the measured data to a multicast address defined for each of the groups. Based on the respective operating statuses of the data processing devices, the groups in which the data processing devices are to join are decided. The data processing devices receive the measured data multi-cast to an address defined for each of the groups, and perform data processing based on the measured data.

According to the present invention, measured data from the measurement devices belonging to one group is transmitted to an identical multicast address. An allocated data processing device can receive all measured data required for data processing by joining in a pertinent (multicast) group. As a result, the data processing devices are smoothly allocated.

In the processing distribution method by the present invention, when data processing devices serving as reception sides of the measurement devices are changed, a measurement data delivery destination is not changed for the measurement devices, and the data processing devices can be smoothly allocated even in a system including a large number of measurement devices.

In the processing distribution method by the present invention, since the data processing devices do not need to be disposed under a certain load distribution device, the data processing devices can be distributedly disposed on a network, providing flexibility for system construction.

BRIEF DESCRIPTION OF THE DRAWINGS

FIG. 3 is a drawing of a table structure showing the classification of measurement devices by groups and the allocation of multicast addresses to the groups in a measurement system according to a first embodiment;

FIG. 4 is a drawing of a table structure showing information held by a management device with respect to data processing devices in a measurement system according to a first embodiment;

FIG. 7 is a drawing of another table structure showing the classification of measurement devices by groups and the allocation of multicast addresses to the groups in a measurement system according to a second embodiment of the present invention;

FIG. 8 is a drawing of a table structure showing information held by a management device with respect to data processing devices in a measurement system according to a second embodiment of the present invention;

DETAILED DESCRIPTION OF THE PREFERRED EMBODIMENTS

Hereinafter, a measurement system and a processing distribution method using the system according to the present invention will be described in detail with reference to the accompanying drawings.

First Embodiment

A first embodiment of a measurement system and a processing distribution method using the system according to the present invention is using FIGS. 1 to 6.

Figure 1:
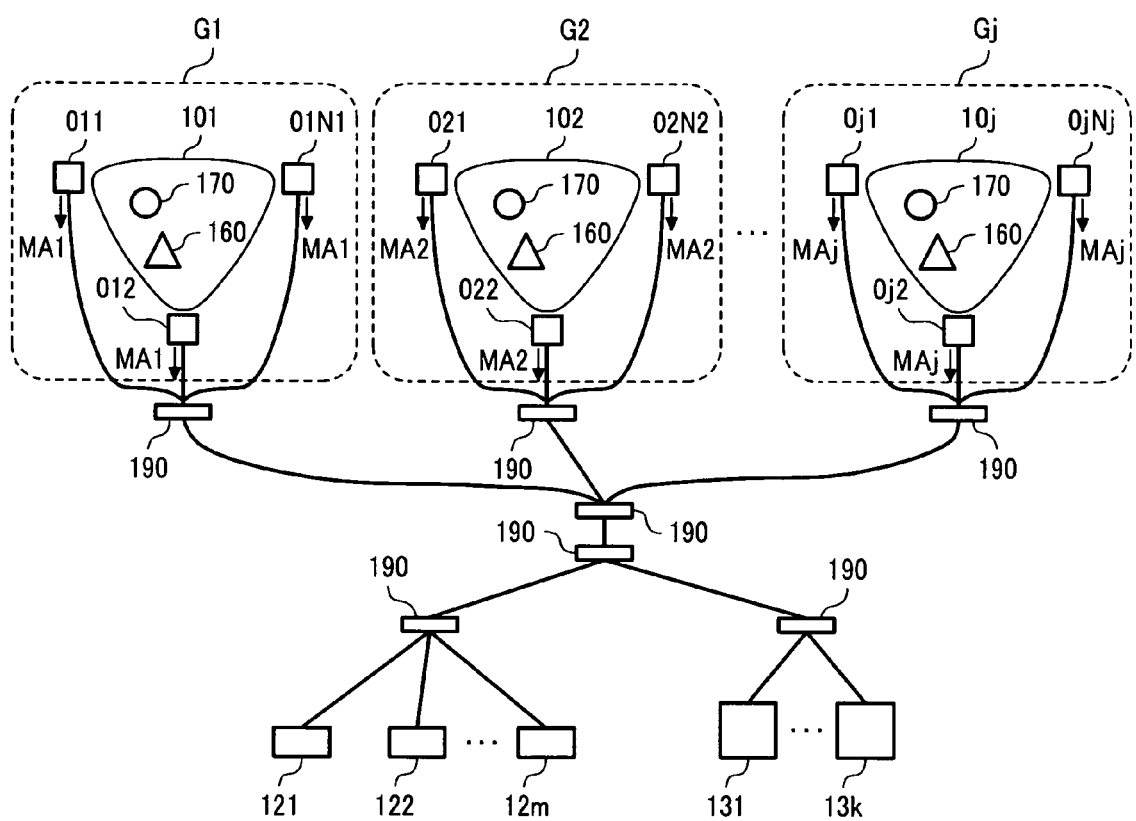
FIG. 1 is a block diagram of a measurement system according to a first embodiment of the present invention.

In FIG. 1, an area subject to measurement of the measurement system is split into plural areas 101, 102, ... and 10j. 011, 012, ... and 01N1, 021, 022, ... and 02N2, 0j1, 0j2, ... and 0jNj designate measurement devices. These measurement devices are grouped into sets of plural measurement devices represented as groups G1-Gj, and are disposed in the respective areas 101, 102, ... and 10j of group G1-Gj. 121, 122, ... and 12m designate data processing devices. 131, ... and 13k designate management devices. 160 is a terminal, and can move within individual areas or among plural areas. 170 designates a base station stationarily disposed. 190 designates a network switch.

As one example, the measurement devices, terminals, and base stations respectively include a communication part, an information storage part, a clock, a processing part, and an I/F and the like for connecting to a network. Since the terminals can move, depending on embodiments, in some cases, plural terminals always exist within the respective areas, while in other cases, the number of terminals changes with time. The measurement system has, for example, a function to trace a specific terminal that moves among plural areas.

The measurement devices 011, 012, and 01N1 belong to the group G1, and perform measurement in the area 101. The measurement devices 011, 012, and 01N1 respectively transmit the respective measured data to a multicast address MA1 allocated to the relevant group G1.

Likewise, the measurement devices 0j1, 0j2, and 0jNj belong to the group Gj, and perform measurement of the position of the terminal 160 and the like in the area 10j. The measurement devices 0j1, 0j2, and 0jNj respectively transmit the respective measured data to a multicast address MAj allocated to the relevant group Gj.

Depending on embodiments, the base station 170 may be omitted to perform measurement by the measurement devices alone.

The measurement devices of each group detect the positions of the terminals 160 existing in the respective areas by respectively using an internal clock to respectively measure the reception times of wireless signals from the base station 170 and the terminals 160, and respectively transmitting the measured data to multicast addresses allocated to the respective groups.

The measurement devices may belong to plural areas for the reason of, for example, existing on area boundaries, and may respectively transmit measured data measured in the plural areas to plural allocated multicast addresses.

The data processing devices 121, 122, ... and 12m receive multicast measured data from groups in which they are joined, and respectively perform data processing.

For example, the data processing device 12m is joined in the group Gj, and the measurement devices 0j1, 0j2, and 0jNj receive measured data transmitted to the multicast address MAj. The respective measured data includes reception times of wireless signals from the terminal 160 and the base station 170 existing in the area 10j. The data processing device 12m decides the position of the terminal 160 from the positions of predetermined measurement devices and the reception times. For details of a position deciding method, the above US 2004/0046693 A1 is referred to. Here, a position deciding method will be briefly described.

The measurement devices 011-01N1 belonging to the group G1 are commanded to monitor predetermined wireless channels used for position detection. The base station 170 transmits a second wireless packet on the wireless channel. The measurement devices 011-01N1 of the group G1 respectively measure the reception time of the second wireless packets. The terminal 160 transmits a first wireless packet on the wireless channel. The measurement devices 011-01N1 commanded to monitor the wireless channels respectively measure the reception times of the respective wireless packets. After the measurement, the measurement devices 011-01N1 respectively transmit the respective measurement results to the multicast address MA1 to transfer the measurement results to the data processing device 121 joined in the group G1. The data processing device 121 determines the position of the terminal 160 from the measurement results, using equations disclosed in US 2004/0046693 A1, for example.

One data processing device may join plural groups and perform data processing by receiving data measured in the plural areas.

The management devices 131, ... and 13k manage the status in which the data processing devices join in groups. The management devices 131, ... and 13k also manage processing load amounts on the respective groups in which the processing devices are joined. The management devices 131, ... and 13k may serve as a main device and a standby device and operate synchronously with each other to maintain same conditions against a failure in the main device.

The network switch 190 transfers the measured data multicast from the measurement devices, preferably, only to a communication port to which data processing devices are joined in the group to receive the data are connected. The network switch may solve a transfer destination of the multicast by using IGMP (Internet Group Management Protocol), for example.

Figure 2:
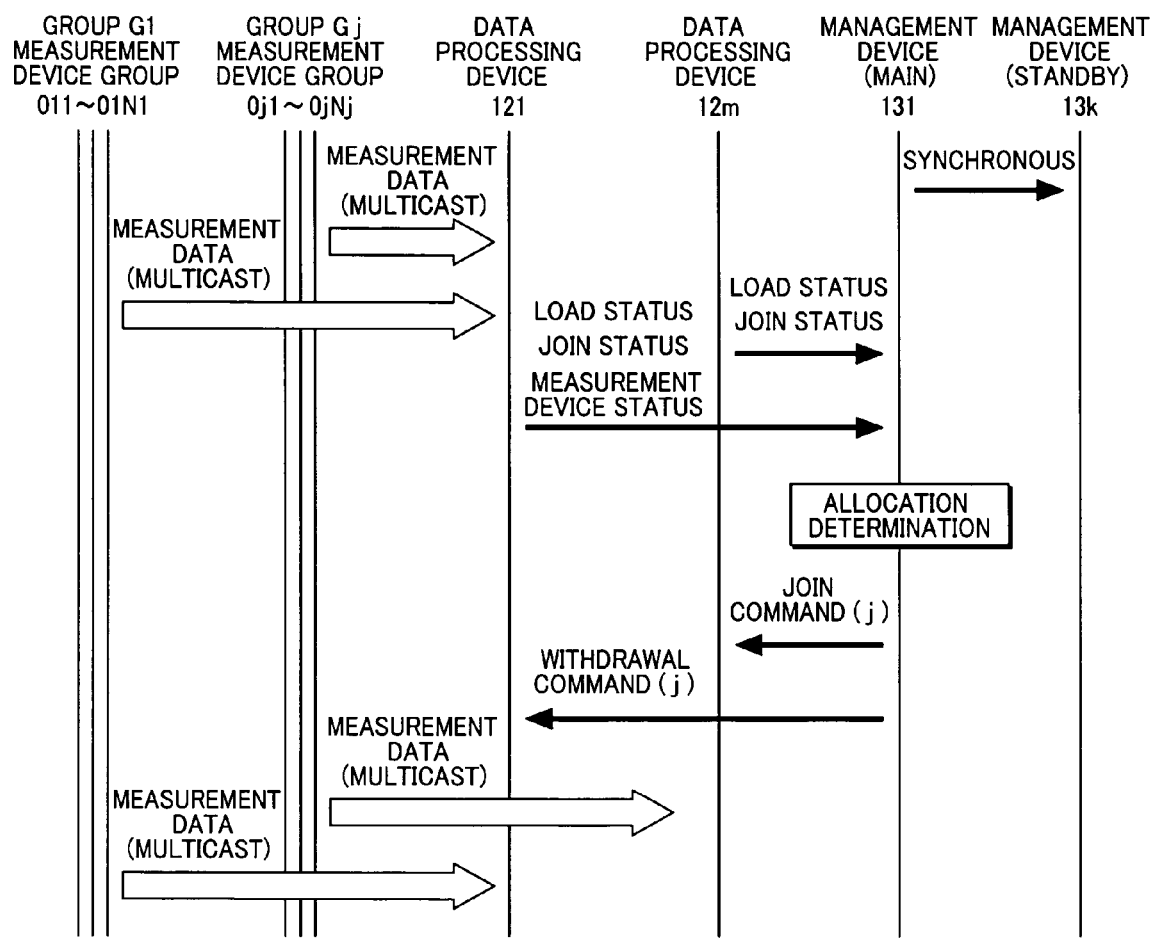
FIG. 2 is a flowchart showing a processing distribution method according to a first embodiment.

The following describes a load distributing method of the measurement system of this embodiment with reference to FIGS. 2 to 4.

The measurement devices are grouped so as to belong to any one of groups. For example, in FIGS. 2 and 3, the group G1 includes the measurement devices 011 to 01N1, and the group Gj includes the measurement devices 0j1 to 0jNj. In FIG. 2, "group G1 measurement devices 011 to 01N1" is a generic name of plural measurement devices 011 to 01N1 that belong to group G1, and "group G1 measurement devices 0j1 to 0jNjj" is a generic name of plural measurement devices 0j1 to 0jNj that belong to group Gj.

A multicast address is allocated to each group in advance. For example, as shown in FIG. 3, a multicast address "239.128.0.1" is allocated to the group G1, and a multicast address "239.128.0.2" is allocated to the group G2.

The measurement devices transmit data measured by each of them to a multicast address allocated to a group to which each of them belongs.

Each data processing device joins a group specified by a management device, receives measured data transmitted to a multicast address allocated to the group, and performs data processing. For example, in an example shown in FIGS. 2 to 4, the data processing device 121 joins in the groups G1 and Gj, receives all data transmitted to multicast addresses "239, 128.0.1" and "239.128.0.j" from the measurement devices, performs data processing, and detects the positions of the terminals 160 existing in the groups G1 and Gj.

The flowchart of FIG. 2 describes a processing distribution method by the first embodiment. In FIG. 2, the measurement devices 011 to 01N1 and 0j1 to 0jNj respectively belonging to the groups G1 and Gj respectively monitor predetermined wireless channels. When the terminal 160 transmits a first wireless packet onto the above-described wireless channel, and the base station 170 transmits a second wireless packet, the respective measurement devices of the groups G1 and Gj measure the reception times of the first and the second wireless packets. After the measurement, the measurement devices transmit the respective measurement results to the multicast addresses to transfer the measurement results to the data processing device 121. The data processing device 121 calculates the position of the terminal 160, based on the measurement results, for example, using the equation disclosed in US 2004/0046693 A1. Other data processing devices also perform the same processing to calculate the positions of the terminals 160 existing in the groups G1 and Gj.

The data processing devices notify the management devices of the respective load status (e.g., the respective CPU use percentages) and the join status to the groups, according to a request from the management devices 131 (and 13k) or in a fixed cycle.

The management device 131 receives notice from the data processing devices and holds the respective load status and the join status to the groups. For example, it holds table contents as shown in FIG. 4.

In the table of FIG. 4, a first column contains the identification number of a data processing device, a second column contains the identification number of a group in which the data processing device is joined, and a third column contains its load status. For example, FIG. 4 shows that the data processing device 121 is joined in the groups G1 and Gj, and its CPU use percentage is 90%. The management device 131 may hold a failure status of each data processing device, as shown in the fourth column of FIG. 4. Each data processing device may notify the management device of the existence or absence of failure, or a data processing device that has not reported various statuses for a given period of time may be determined to be in a fail status by the management device.

The management device 131 monitors the load status and failure existence/absence of individual data processing devices to allocate data processing. For example, on detecting a data processing device exceeding a predetermined threshold or having failure (hereinafter referred to as an abnormal processing device), the management device searches for a normal and less loaded data processing device (hereinafter referred to as an alternative processing device). A part or all of processing allocated to the abnormal processing device is allocated to the alternative processing device. More specifically, the management device commands the alternative device to join a part or all of groups in which the abnormal processing has joined, and commands the abnormal processing device to leave the specified groups.

In the example of FIGS. 2 to 4, the management device determines the data processing device 121 having a CPU use percentage of 90% as an abnormal processing device, and the data processing device 12m having a CPU use percentage of 5% as an alternative processing device, and commands the data processing device 12m to join the group Gj and the data processing device 121 to leave the group Gj. Consulting the contents of the table of FIG. 3, the data processing device 12m joins the group Gj, receives all data transmitted from the measurement devices to the multicast address "239.128.0.j," and performs data processing. On the other hand, the data processing device 121 leaves the group Gj, and stops the reception of measured data transmitted from the measurement devices to the multicast address "239.128.0.j" and the data processing.

As has been described above, according to a processing distribution method of the measurement system according to the present invention, measured data from the measurement devices belonging to one group is transmitted to the identical multicast address. An allocated data processing device can receive all measured data required for the data processing by joining in a pertinent (multicast) group. As a result, the transition of data processing is smoothly performed.

If the data processing devices notify the management device of the status of a relevant measurement device, based on the reception of measured data, the management device can manage operating statuses of individual devices, so that usability is increased.

An embodiment of the management device of the present invention is described with reference to FIG. 5. In the drawing, a management device 500 includes a NIC (Network Interface Card) 501, a data processing device information storage part 502, and a processing allocation part 503.

The NIC 501 enables communication between a relevant management device and individual data processing device on a network, or another management device.

The data processing device information storage part 502 stores the load status of individual data processing devices, failure existence/absence, and the join status to groups by the above-described method. For example, it stores table contents as shown in FIG. 4.

The processing allocation part 503 consults the data processing device information storage part 502, and monitors the load status of individual data processing devices and failure existence/absence to allocate processing to the data processing devices by the above-described method.

Figures 5, 6:
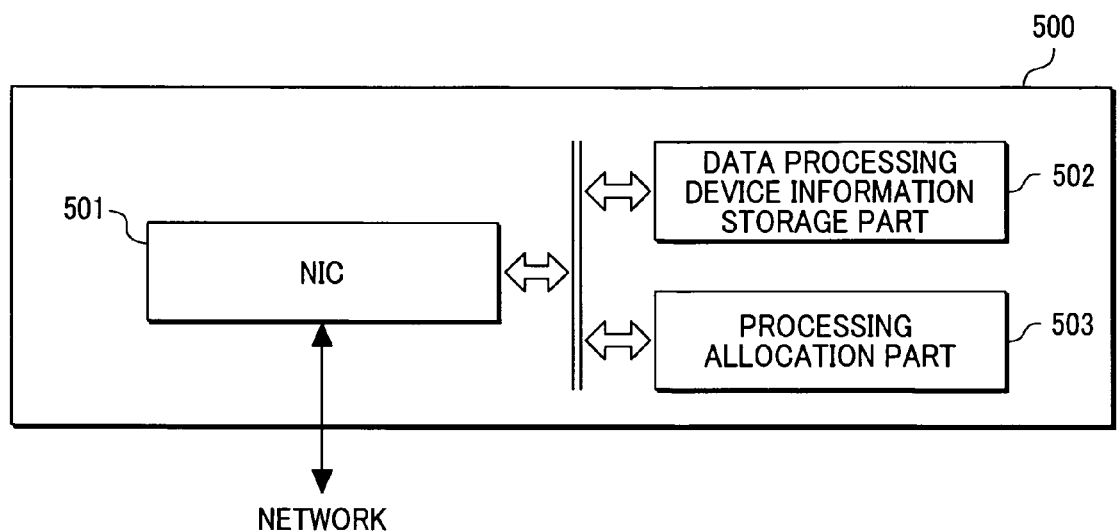
FIG. 5 is a block diagram of a management device in a measurement system according to a first embodiment.
FIG. 6 is a drawing of another table structure showing information held by a management device with respect to data processing devices in a measurement system according to a first embodiment.

Storing the load status (CPU use percentage) of the data processing devices stored by the data processing device information storage part 502 in units of groups in which the data processing devices are joined as shown in FIG. 6 would contribute to smoother processing distribution.

As has been described above, according to this embodiment, measured data from the measurement devices belonging to one group is transmitted to an identical multicast address. An allocated data processing device can receive all measured data required for data processing by joining in a pertinent (multicast) group. As a result, the data processing devices are smoothly allocated.

For example, even when the position of a terminal to be monitored changes continuously from an area to which the group G1 belongs to an area to which the group Gj belongs, and accordingly processing amounts of measured data corresponding to the groups change with time, processing in the data processing devices is smoothly performed. Or even when the number of terminals 160 existing in areas of a specific group change with time, data processing in the data processing devices is smoothly performed.

In the processing distribution method according to this embodiment, when the data processing devices serving as a reception side of the measurement devices are changed, measurement data delivery destinations are not changed for the measurement devices, and even in a system including a large number of measurement devices, the data processing devices can be smoothly allocated. Furthermore, in the processing distribution method according to this embodiment, since the data processing devices do not need to be organized to be disposed under a certain load distribution device, the data processing devices can be distributedly disposed on a network, so that the system is flexibly constructed.

Second Embodiment

It is conceivable that the importance of measurement for measurement areas is not equal. For example, the importance of measurement in dangerous areas may be generally higher. Accordingly, priority may be given to each of groups to which the measurement devices belong.

Figure 9:
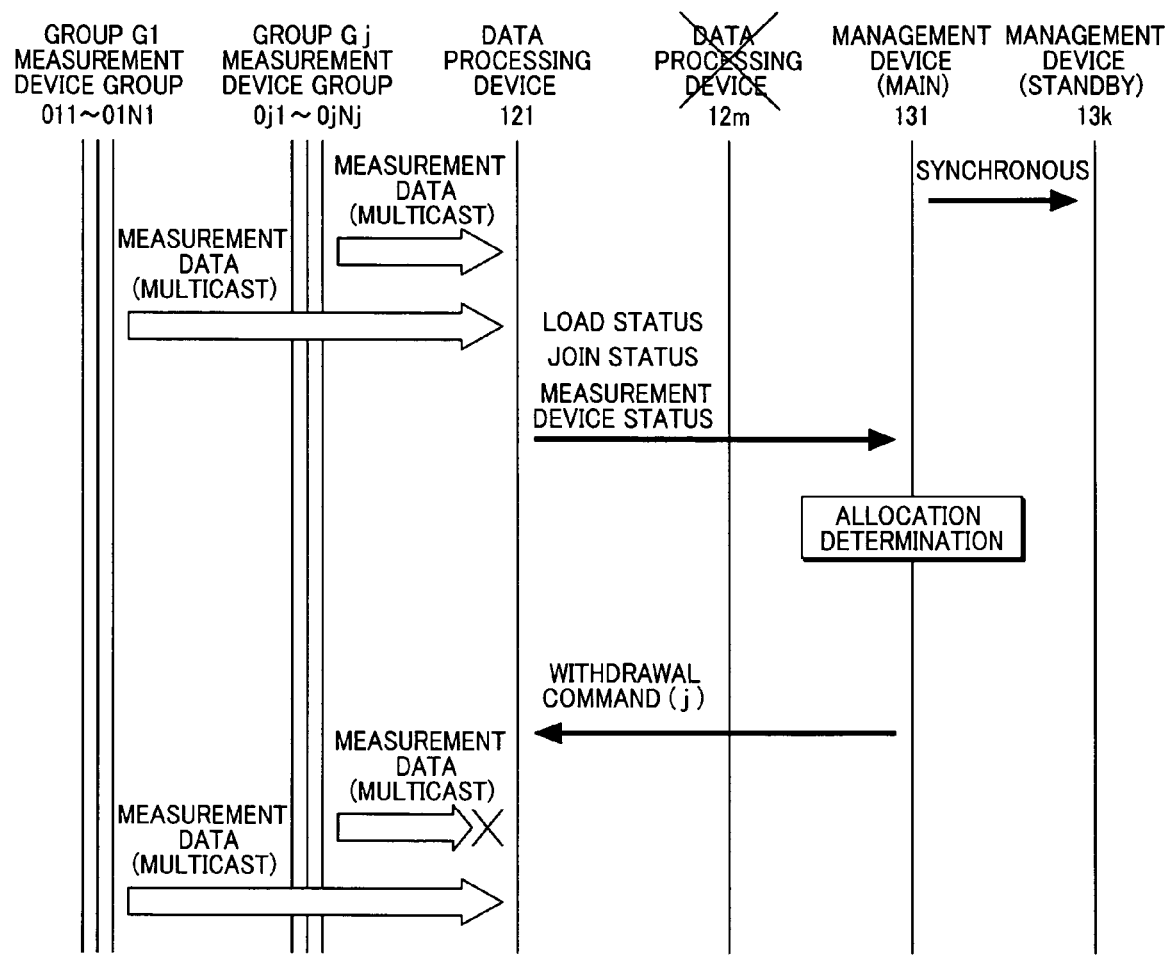
FIG. 9 is a flowchart showing another processing distribution method according to a second embodiment of the present invention.

Such an example is described as a second embodiment of the present invention with reference to FIGS. 7 to 9.

FIG. 7 shows a table showing the classification of measurement devices by groups and the allocation of multicast addresses to the groups in a measurement system according to this embodiment. The drawing is different from the table shown in FIG. 3 of the first embodiment in that the groups have a priority level. For example, the priority of the group G1 is P1=1, and the priority of the group Gj is Pj=2. In short, the importance of the group G1 is higher than others.

In a case where priority is provided in this way, assume that the data processing devices are loaded as shown in FIG. 8. In short, the data processing devices 122 to 12m other than the data processing device 121 are in a failing status. Furthermore, let us assume that the data processing device 121 is heavily loaded with a CPU use percentage of 100% and cannot sufficiently process data. Such a case is actually possible. For example, when a network failure occurs in plural data processing devices 122 to 12m, and the amount of loads impossible to process concentrate on the remaining data processing device 121. In this case, the management device determines allocation according to the priority of the groups to adjust the loads on the data processing device 121.

For example, in the examples shown in FIGS. 7 to 9, the management device 131 commands the data processing device 121 joined in the groups G1 and Gj to leave the group Gj of a lower priority to relieve it from a highly loaded state. The data processing device 121 leaves the group Gj and stops the reception of measured data transmitted to the multicast address "239.128.0.j" from the measurement devices and processing for the data to reduce its own load. The above-described allocation determination based on group priority contributes to reduction in the risk of the dropout of important data processing.

Third Embodiment

It is conceivable that the importance of measurement for individual areas is not fixed. For example, as a more important terminal to be measured moves among plural areas, the importance of measurement of the areas changes with time. In this case, the priority of the groups may be decided based on the position of the terminal, that is, data processing results.

Figure 10:
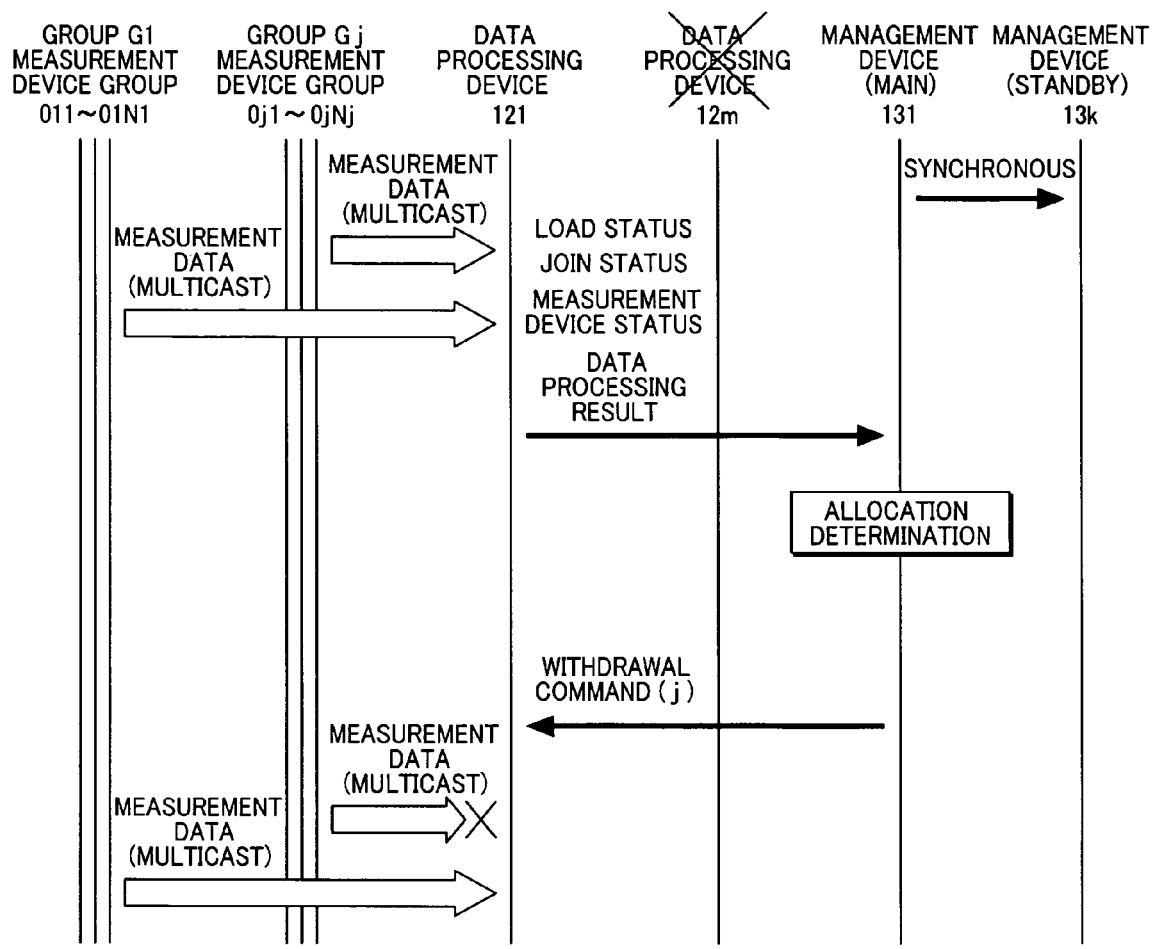
FIG. 10 is a flowchart showing further another processing distribution method according to a third embodiment of the present invention.

Such an example is described as a third embodiment of the present invention with reference to FIG. 10.

For example, as shown in FIG. 10, data processing results by the data processing device 121 are transmitted to the management device. For example, for the reason that the results show that a more important area to be measured exists in the area 101, the priority of the group G1 is set higher than that of other groups, as shown in FIG. 7. As a result, the management device commands the data processing device 121 to leave the group Gj of a lower priority. The data processing device 121 leaves the group Gj, stops the reception of measured data transmitted to the multicast address "239.128.0.j" from the measurement devices and processing for the data, and preferentially performs processing of the group G1. As described above, the decision of the priority of individual groups based on data processing results contributes to reduction in the risk of the dropout of important data processing.

The present invention can be effectively used for distribution control of loads on server devices in scenes of application to large-scale operation of a system that locates the positions of wireless LAN terminals provided for humans and objects.

What is claimed is:

1. A measurement system comprising:
    a plurality of measurement devices connected over a network, each of the measurement devices belonging to any one of a plurality of groups, and transmitting measured data to a multicast address which corresponds to a group to which the respective measurement device belongs;
    a plurality of data processing devices that receive the measured data of which the destination is the multicast address which corresponds to the group assigned to each data processing device, and that perform data processing based on the measured data; and
    a management device which decides the groups in which the data processing devices are to join, based on the join status of the data processing devices to the groups and load amounts of processing on the groups in which they are joined, and assigns at least one of the data processing devices to either of groups based on respective operating statuses of the data processing devices;
    wherein the plurality of measurement devices are classified into groups, based on the disposition positions of the respective measurement devices.

2. The measurement system according to claim 1, wherein each of the plurality of groups has priority on the data processing.

3. The measurement system according to claim 2, wherein the priority is decided based on the result of the data processing.

4. The measurement system according to claim 1, wherein at least one of the measurement devices belongs to the plurality of groups, and transmits measured data to a plurality of multicast addresses defined for each of the groups.

5. The measurement system according to claim 1,
    wherein a measurement target area of the measurement system comprises a plurality of areas, wherein the measurement devices are classified into groups, based on the disposition positions of the measurement devices in each of the areas,
    wherein at least one terminal can move within the plurality of split areas,
    wherein the measurement devices of the groups corresponding to the areas perform measurement on the terminals existing in the areas, and wherein the data processing devices joined in the groups receive the measurement data, and perform data processing.

6. The measurement system according to claim 5, wherein the one data processing device joins the plurality of groups, receives the measured data measured in the plurality of areas, and performs the data processing.

7. A management device, in a measurement system including a plurality of measurement devices connected over a network, and a plurality of data processing devices that receive data measured by the measurement devices and perform data processing, comprising:
- a data processing device information storage part which holds information about multicast addresses each assigned to each of the groups with respect to the measurement devices respectively belonging to specific groups; and
- a processing allocation part which assigns at least one of the groups to the data processing device, and which sends, to the data processing device, an instruction to receive measured data of which the destination is the multicast address which corresponds to the group assigned to the data processing device and to process the measured data;
- wherein the plurality of measurement devices are classified into groups, based on the disposition positions of the respective measurement devices,
- wherein the data processing device information storage part stores the respective operating statuses of the data processing devices, and information about groups of the join destinations, and
- wherein the processing allocation part decides the groups in which the data processing devices are to join, based on the join status of the data processing devices to the groups and load amounts of processing on the groups in which they are joined.

8. The management device in a measurement system according to claim 7,
- wherein the data processing device information storage part stores the respective operating statuses of each of the data processing devices, and information about groups of each of the join destinations, and
- wherein the processing allocation part allocates the plurality of groups according to priority of the data processing.

9. The management device in a measurement system according to claim 8, wherein the processing allocation part decides each of the priorities, based on the data processing result.

10. A processing distribution method in a measurement system which includes a plurality of measurement devices connected over a network, a management device, and a plurality of data processing devices, the method comprising the steps of:
- assigning, by the management device, the data processing devices to respective ones of a plurality of groups based on respective operating statuses of the data processing devices;
- transmitting, by the measurement devices, measured data to multicast addresses corresponding to each of the groups to which the measurements devices belongs;
- receiving the measured data, by the data processing devices, as the destinations related to the multicast addresses which correspond to the groups;
- performing, by the data processing devices, data processing based on the measured data;
- deciding, by the management device, the groups in which the data processing devices are to join based on the join status of the data processing devices to the groups and load amounts of processing on the groups in which they are joined; and
- re-assigning, by the management device, at least one of the data processing devices to any of the groups based on respective operating statuses of the data processing devices;
- wherein the plurality of measurement devices are classified by groups, based on the disposition positions of each of the measurement devices.

11. The processing distribution method according to claim 10, wherein the plurality of groups have priorities on the data processing.

12. The processing distribution method according to claim 11, wherein each of the priorities is decided based on the data processing result.

* * * * *